A. BAYER AND A. KLINGELE.
FLYTRAP.
APPLICATION FILED MAR. 15, 1919.
1,328,114.
Patented Jan. 13, 1920.
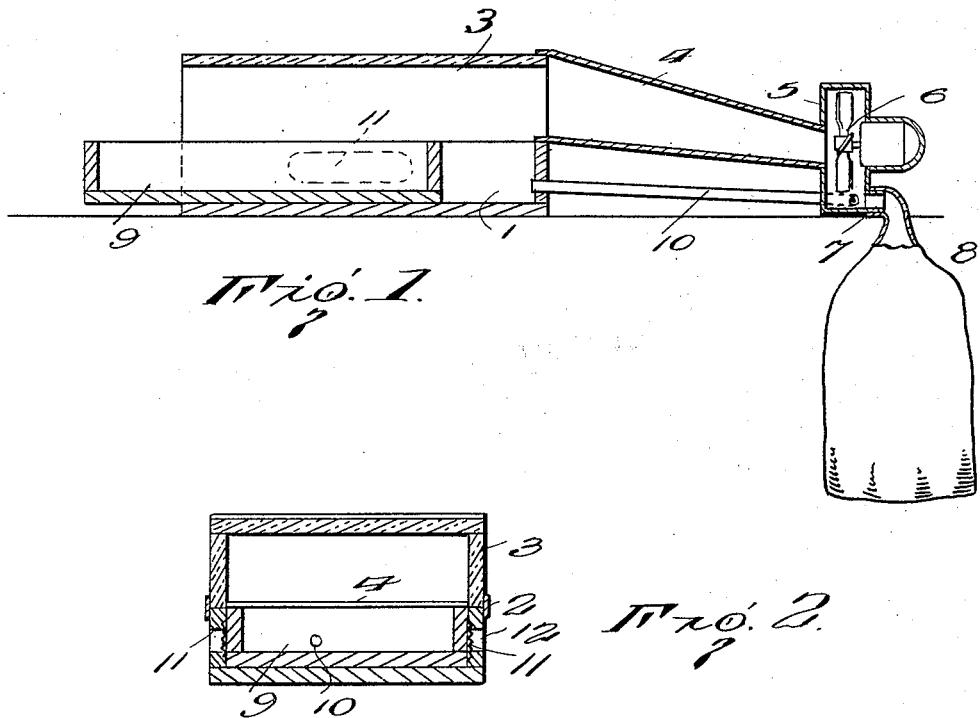
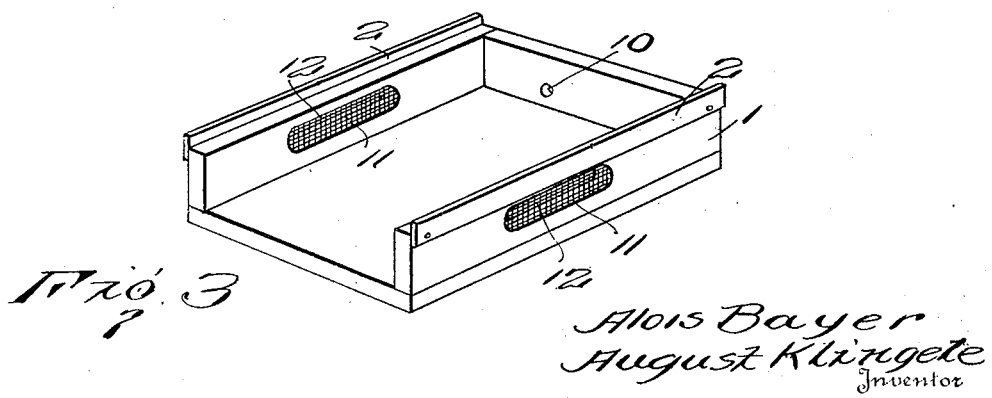
Alois Bayer
August Klingele
Inventor
By Geo. P. Kimmel
Attorney

UNITED STATES PATENT OFFICE.

ALOIS BAYER AND AUGUST KLINGELE, OF LORAIN, OHIO.

FLYTRAP.

1,328,114.  Specification of Letters Patent.  Patented Jan. 13, 1920.

Application filed March 15, 1919. Serial No. 282,814.

*To all whom it may concern:*

Be it known that we, ALOIS BAYER, a Czecho-Slovak, and AUGUST KLINGELE, citizen of the United States, residing at Lorain, in the county of Lorain and State of Ohio, have invented certain new and useful Improvements in Flytraps, of which the following is a specification.

This invention relates to an improved fly trap and the principal object of the invention is to provide an improved trap in which the flies will be admitted to a compartment above an inclosed bait pan and from this compartment drawn into a fan housing and expelled from the fan housing into a container such as a sack through which air may readily pass.

A further object of the invention is to so construct this trap that air may be fed to the compartment containing the bait.

Another object of the invention is to so construct the trap that the flies will be prevented from consuming the bait.

This invention is illustrated in the accompanying drawings wherein,

Figure 1 is a view showing the improved trap in longitudinal section,

Fig. 2 is a transverse sectional view through the trap, and

Fig. 3 is a perspective view of the base or housing in which the bait receptacle will be placed.

This improved trap is provided with a housing having a base 1 which will be formed preferably of wood or some other suitable material and will be provided with side strips 2 for holding the upper section or super-structure 3 in place upon the base 1. This upper section or super-structure 3 is formed of glass or some other transparent material and is further provided with an extension 4 leading from its open rear end and communicating with an inlet opening in the fan housing 5. A fan 6 is positioned in the fan housing and it will be readily seen that when this device is in use the fan will cause a suction which will draw flies out of the upper portion of the housing through the extension 4 and into the fan housing 5 from which they will be driven through the outlet 7 and into the sack or other receptacle 8. The flies will be retained in this receptacle 8 by closing the mouth of the sack before disconnecting it from the neck 7 which sack can be removed and the flies killed without danger of their escaping.

The bait receptacle 9 is placed in the base of the housing and is in the form of a sliding drawer which may be easily removed when desired. This receptacle or pan 9 fits loosely for free movement in the base 1 of the housing and air is supplied to the housing through the medium of a pipe 10. Of course the end of the pipe 10 at the fan housing 5 will be provided with a screen covering so that the flies will not be driven back through this pipe into the base of the trap.

Prior to setting the fan in operation, sugar or other food stuff is placed in the tray 9 for attracting the insects. Part of the air drawn into the fan housing will be driven through the pipe 10 back into the pocket behind the tray 9 preventing flies from accumulating behind. The flies will enter the housing through the open outer or forward end of the super-structure 3. As the fan causes a suction through the extension 4 leading from the super-structure of the housing the flies will be drawn through this extension into the fan housing 5 and will be carried out through the outlet neck 7 into the sack or container 8. When a sufficient number of flies have accumulated in the container 8 the fan may be stopped and the container removed, a string being tied around the neck of the sack in order to hold the flies therein if desired. It is of course obvious that any means may be used for closing the neck of the sack. It will thus be seen that there has been provided a trap which will be very efficient in operation and will be simple in construction and further be composed of parts which are not liable to readily get out of order.

What is claimed is:

1. A trap comprising a housing, a bait holder in the housing, and common means for withdrawing flies from the housing and supplying an air blast to the housing behind the bait container.

2. A fly trap comprising a housing, removable bait holding means in the housing, and means for withdrawing flies from the housing and supplying an air blast behind the bait holder to prevent the accumulation of flies.

3. A trap comprising a housing having its upper portion open at opposite ends, a fan housing having a flange therein and provided with an inlet and an outlet, a conduit leading from one open end of the housing and communicating with the inlet of the fan housing, a removable bait holder arranged in the first mentioned housing beneath the opposite open end thereof, a pipe connecting the outlet of the fan housing with the first mentioned housing at a point behind the bait holder for preventing the accumulation of flies, and a container having connection with the fan housing.

In testimony whereof we affix our signatures hereto.

ALOIS BAYER.
AUGUST KLINGELE.